United States Patent
Oudraad

(10) Patent No.: US 9,741,464 B1
(45) Date of Patent: Aug. 22, 2017

(54) CONDUCTIVE GROUND TAB TEMPLATE AND GROUNDING METHOD

(71) Applicant: The Boeing Company, Chicago, IL (US)

(72) Inventor: Nancy A. Oudraad, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/132,186

(22) Filed: Apr. 18, 2016

(51) Int. Cl.
 *H01B 5/00* (2006.01)
 *H01B 1/06* (2006.01)
 *H01B 13/00* (2006.01)

(52) U.S. Cl.
 CPC .......... *H01B 5/002* (2013.01); *H01B 1/06* (2013.01); *H01B 13/0026* (2013.01)

(58) Field of Classification Search
 USPC ...................................... 174/126.2
 See application file for complete search history.

(56) References Cited

U.S. PATENT DOCUMENTS

| | | | | |
|---|---|---|---|---|
| 2,344,635 A | * | 3/1944 | Priestley | H01B 11/1091 174/107 |
| 2,498,493 A | * | 2/1950 | Hickernell | H01B 1/00 106/217.01 |
| 2,808,352 A | * | 10/1957 | Coleman | H01B 1/22 174/117 A |
| 2,964,587 A | * | 12/1960 | Minot | H01B 7/0838 174/117 A |
| 4,496,444 A | * | 1/1985 | Bagnulo | C23F 13/02 138/103 |
| 8,431,206 B2 | * | 4/2013 | Kim | C09J 7/0296 174/117 A |

* cited by examiner

*Primary Examiner* — Timothy Thompson
*Assistant Examiner* — Krystal Robinson
(74) *Attorney, Agent, or Firm* — Miller, Matthias & Hull LLP

(57) ABSTRACT

A conductive ground tab template is provided and a corresponding method for providing a ground utilizing the same. According to one aspect, a conductive ground tab template includes a barrier layer and an adhesive layer. The adhesive layer provides for removable attachment to a structure. A cutout region of the conductive ground tab template is encompassed by the barrier layer and has a configurable arrangement for receiving conductive material and creating a ground tab.

20 Claims, 6 Drawing Sheets

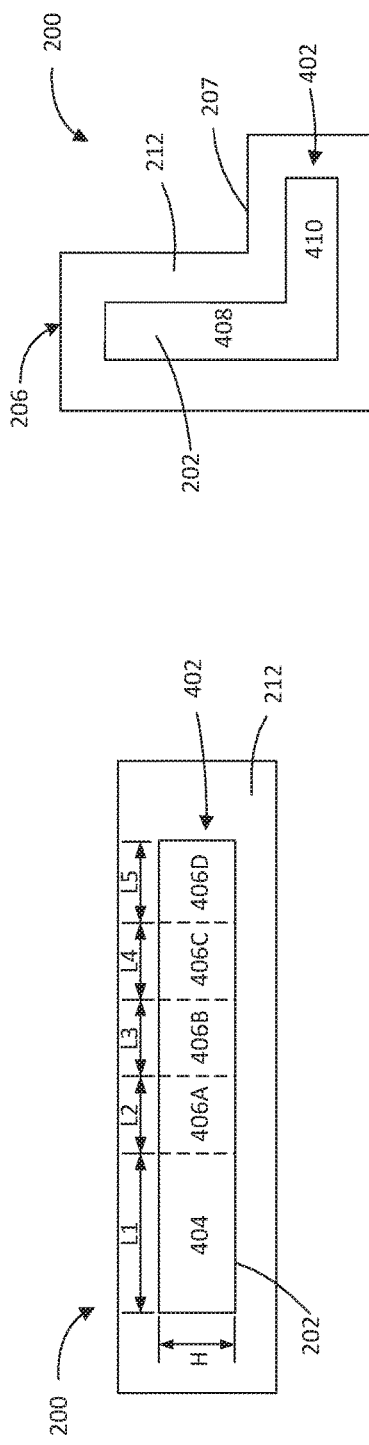
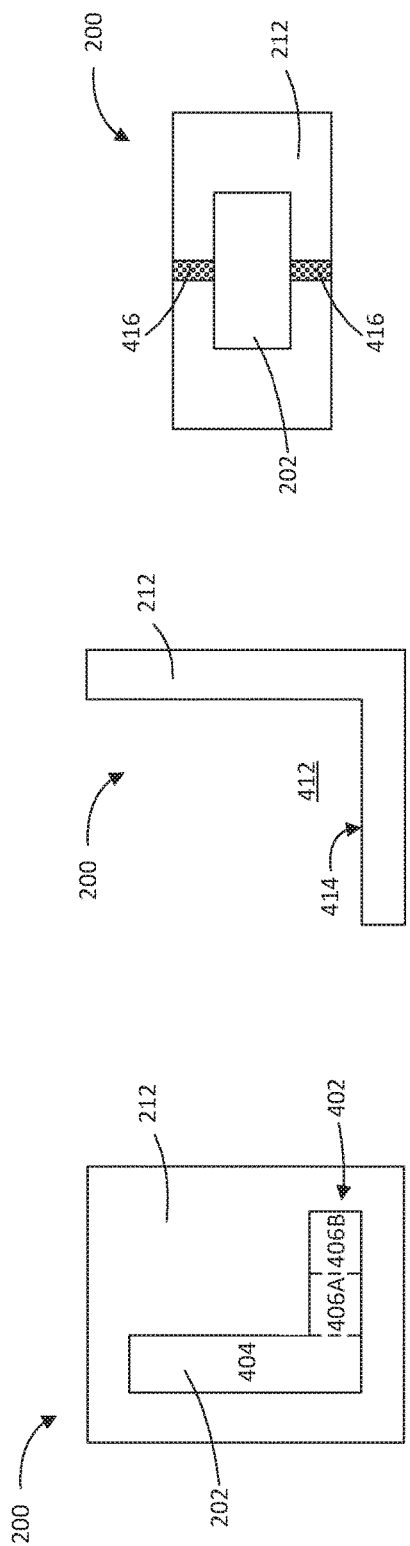

CONDUCTIVE GROUND TAB TEMPLATE AND GROUNDING METHOD

BACKGROUND

Many structures require components to be joined together with a fitting that requires electrical grounding. For example, flight hardware for satellite applications may include graphite tubes connected via a titanium fitting. To ground the joint, a conductor, or grounding wire, may be secured in place over the joint using a conductive rubber-like material. One implementation is a conductive ground tab. A conductive ground tab includes a conductor secured to the underlying fitting or structure being grounded by a conductive compound.

In preparing conductive ground tabs, there is currently no standardized process used by all technicians. For any particular application, there may be numerous ground tabs required on a structure, with varying dimensions required according to engineering specifications of the specific implementation. For each ground tab, a technician will typically tape off an area to which the ground tab will be applied, which may require cutting the tape to the applicable dimensions. This process is cumbersome and time consuming. Additionally, the repeated use of a cutting tool increases the risk of an injury.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a conductive ground tab template and grounding method. According to one aspect, a conductive ground tab template includes a barrier layer and an adhesive layer. The barrier layer has a top barrier surface and a bottom barrier surface. The top barrier surface prevents a conductive material applied to the top barrier surface from contacting a structure beneath the barrier layer. The adhesive layer has a top adhesive surface attached to the bottom barrier surface, and a bottom adhesive surface configured to be removably attached to the structure. A cutout region has a cutout border encompassed by the barrier layer and has a configurable arrangement according to a number of application locations.

According to yet another aspect, a method for forming a conductive ground tab is provided. The method includes applying a conductive ground tab template having a cutout region to a structure. Conductive material is applied to a portion of the structure exposed by the cutout region. A first end of a conductor is inserted into a portion of the conductive material to form a conductive electrical path from a second end of the conductor through the conductive material to the structure.

According to another aspect, a conductive room temperature vulcanization (RTV) ground tab template system is provided. The system includes a barrier layer and an adhesive layer. The barrier layer has a top barrier surface and a bottom barrier surface. The top barrier surface prevents a conductive RTV material applied to the top barrier surface from contacting a structure beneath the barrier layer. The adhesive layer has a top adhesive surface attached to the bottom barrier surface, and a bottom adhesive surface configured to be removably attached to the structure. The system includes a number of conductive RTV ground tab templates, each template having an outer scored border and an inner cutout region. The inner cutout region has a cutout border encompassed by the barrier layer and has a configurable arrangement according to a number of application locations.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 4A-4E show top views of conductive ground tab templates according to various alternative embodiments described herein;

DETAILED DESCRIPTION

Figure 1:
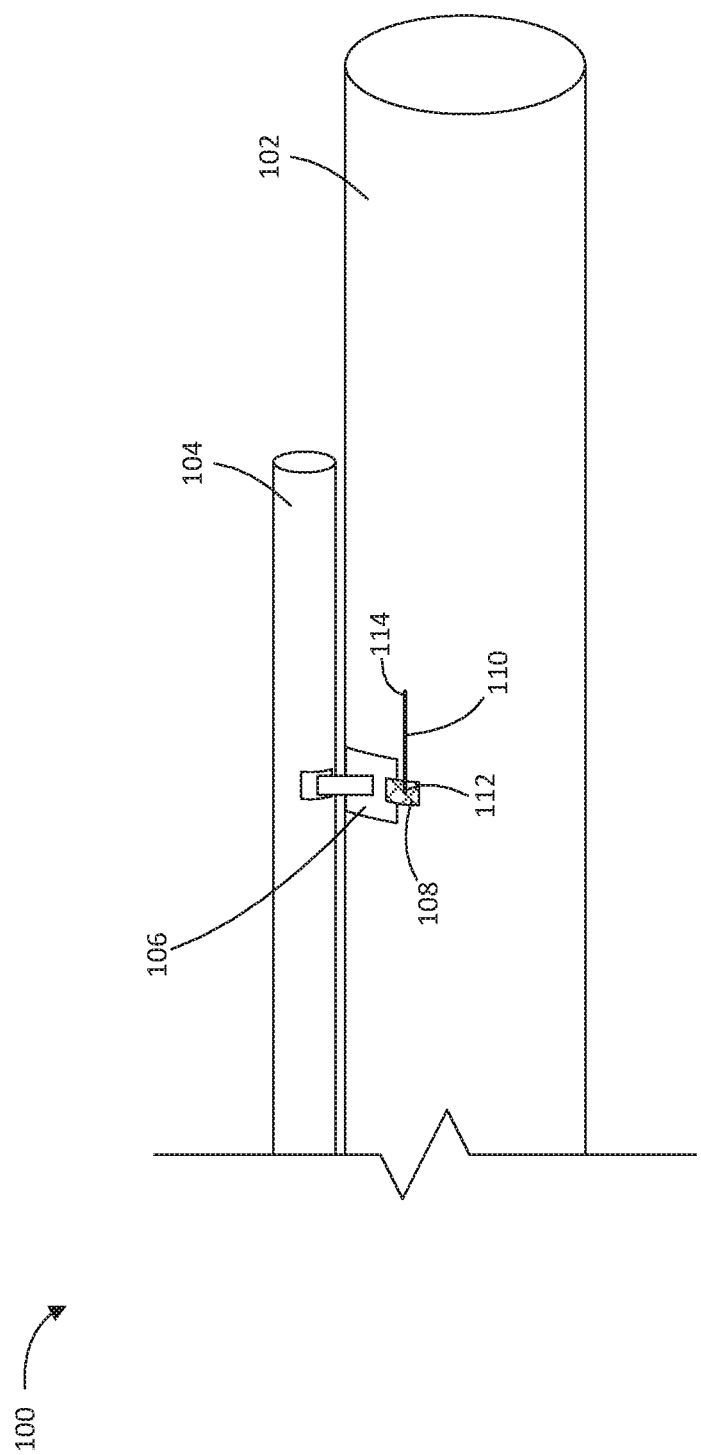
FIG. 1 is a side view of a structure and component being joined with a fitting and grounded with a conductive ground tab according to various embodiments described herein.

The following detailed description is directed to conductive ground tab templates and systems, and a corresponding method for providing a ground utilizing the same. As discussed above, conventional methods for providing a conductive ground tab vary greatly from technician to technician, as there is currently no standardization in the process used. Often, technicians will utilize some type of tape, such as painters' tape, and a utility knife to cut the tape appropriately according to the dimensions required for the specific implementation. The need to cut tape to create an appropriate border for applying a conductive ground tab is time consuming. Moreover, the use of a utility knife introduces a risk that could lead to injury. Standardizing a common task, particularly a task that may be repeated numerous times on a given structure such as a space vehicle, can increase efficiency, improve safety, and enhance quality control.

Utilizing the concepts and technologies described herein, a conductive ground tab template is provided for use in creating a conductive ground tab. The various embodiments discussed herein provide a standardized way in which ground tabs are created, utilizing pre-cut templates that may have variable configurations that allow a technician to quickly and easily configure and apply a template and corresponding conductive ground tab. The conductive ground tab templates described herein reduce ground tab preparation time and improve safety.

In the following detailed description, references are made to the accompanying drawings that form a part hereof, and which are shown by way of illustration, specific embodiments, or examples. Referring now to the drawings, in which like numerals represent like elements through the several figures, a conductive ground tab template and method for utilizing the same to create a conductive ground tab according to the various embodiments will be described.

FIG. 1 shows a side view of a structure 102 and a component 104 being joined with a fitting 106 that is grounded with a conductive ground tab 108 created according to various embodiments described herein. According to this example, the structure 102 and the component 104 are pipes or conduit. It should be understood that the present disclosure is not limited to the creation of conductive ground tabs or the use of conductive ground tab templates with pipes or any particular type of structure or components. Rather, the conductive ground tab templates described herein may be used in any application in which a conductive ground tab is desired. Throughout this disclosure, the various embodiments will be described with respect to the conductive ground tab 108 being created on a structure 102, which could include any type of conductive structure, component, fitting, or combination thereof.

In the example embodiment shown in FIG. 1, the fitting 106 is a metal coupling mechanism. A conductive ground tab 108 is applied over the fitting 106 and the structure 102, with a first end 112 of a conductor 110 secured within the conductive ground tab 108 and routed to ground via a second end 114, forming a conductive electrical path from the second end 114 of the conductor 110 through the conductive material of the conductive ground tab 108 to the structure 102. The conductive ground tab 108 may be positioned over any portion or portions of the fitting 106, the structure 102, and the component 104. The precise location of the conductive ground tab 108 is dependent upon the specific implementation. The dimensions and configuration of the conductive ground tab 108 are also application specific, but may be created using conductive ground tab templates that are universal and configurable as described in greater detail below.

The conductive ground tab 108 may include a conductive material. The conductive material may be a conductive rubber material. According to various embodiments, the conductive rubber material is a room temperature vulcanization (RTV) silicone. Any conductive material may be used that is capable of being applied over the conductive ground tab templates described herein prior to hardening such that when the conductive ground tab template is removed and the conductive material hardens with the conductor inserted within, the desired conductive ground tab is created. Alternative conductive rubber material examples include, but are not limited to, electrically and thermally conductive ABLE-BOND 16-1 and electrostatic discharge coating and thermal control CV2-1148 silicone elastomer.

Figure 2A:
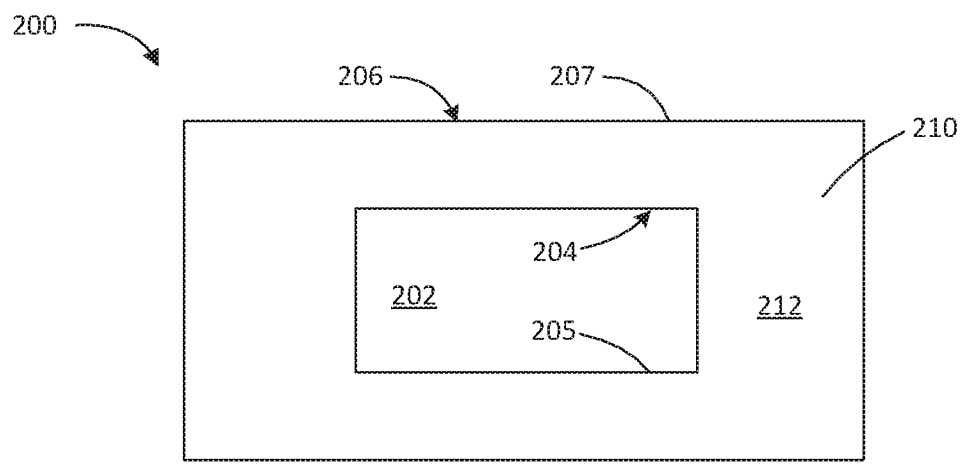
FIG. 2A is a top view of a conductive ground tab template according to various embodiments described herein.
Figure 2B:
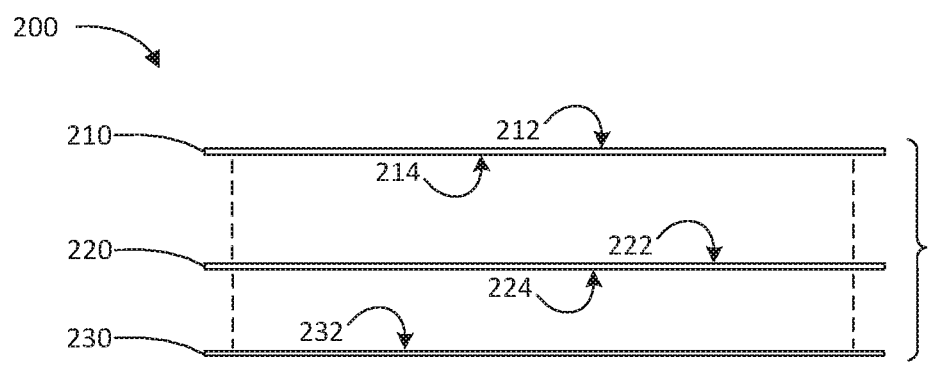
FIG. 2B is a side exploded view of a conductive ground tab template according to various embodiments described herein.

According to the embodiments discussed herein, a conductive ground tab 108 is created using a conductive ground tab template. Turning now to FIGS. 2A and 2B, one illustrative embodiment of a conductive ground tab template 200 will be described. FIG. 2A shows a top view of a conductive ground tab template 200, while FIG. 2B shows an exploded side view of the conductive ground tab template 200 according to one embodiment. The conductive ground tab template 200 includes two primary layers, a barrier layer 210 and an adhesive layer 220. The barrier layer 210 has a top barrier surface 212 on one side of the layer and a bottom barrier surface 214 on the opposing side of the layer. Similarly, the adhesive layer 220 has a top adhesive surface 222 on one side of the layer and a bottom adhesive surface 224 on the opposing side of the layer.

The barrier layer 210 and the adhesive layer 220 are fixedly attached to one another. Specifically, the top adhesive surface 222 of the adhesive layer 220 is fixedly attached to the bottom barrier surface 214 of the barrier layer 210. Fixedly attached may include an adhesive providing a strong bond between the barrier layer 210 and the adhesive layer 220 that is of sufficient strength such that the two layers may not be easily peeled apart by hand. The strength and type of bond utilized to permanently hold an adhesive layer to an adjacent layer is known in the art. According to the implementations described herein, "fixedly attached" means a stronger bond than a bond between layers that are "removably attached," which is described below with respect to the bond between the adhesive layer 220 and the structure 102.

The bottom adhesive surface 224 of the adhesive layer 220 is configured for removable attachment to the structure 102. Removable attachment means that the conductive ground tab template 200 may be attached to the structure 108 via the bottom adhesive surface 224 of the adhesive layer 220 and then subsequently removed from the structure 108 by pulling the conductive ground tab template 200 from the structure 108 such that the bond between the bottom adhesive surface 224 and the structure 108 is broken. The adhesive bond between the adhesive layer 220 and the structure 108 is weaker than the adhesive bond between the barrier layer 210 and the adhesive layer 220 such that pulling the conductive ground tab template 200 upward from the structure 108 will sever the bond between the adhesive layer 220 and the structure 108 while maintaining the adhesive bond between the barrier layer 210 and the adhesive layer 220. According to some embodiments, the bottom adhesive surface 224 of the adhesive layer 220 includes a tacky material for removably attaching the conductive ground tab template 200 to the structure 108. According to one embodiment, the tacky material may include, but is not limited to, a pressure sensitive adhesive, a heat sensitive adhesive, cement, gum, or a combination thereof.

The conductive ground tab template 200 may include a backing layer 230 having a top backing surface 232 removably attached to the bottom adhesive surface 224 to preserve the adhesive prior to attachment to the structure 102. The backing layer 230 is removed prior to use. Characteristics of the backing layer 230 are known in the art.

The conductive ground tab template 200 has a cutout region 202. The cutout region is shaped and sized according to the desired shape and size of the conductive ground tab 108 to be created using the conductive ground tab template 200. The cutout region 202 has a cutout border 204 encompassed by the barrier layer 210. In other words, an inner edge 205 of the barrier layer 210 defines the cutout border 204. The inner edge 205 is closed and continuous so that the inner edge 205 encloses the cutout region 202 inside the boundaries of the cutout border 204. The cutout border 204 is likewise encompassed by the barrier layer 210, which extends outside the boundaries of the cutout border 204.

The barrier layer 210 includes an outer barrier border 206 that is defined by an outer edge 207 of the barrier layer 210. The outer barrier border 206 and the cutout border 204 may be scored to aid in removal from adjacent material. One or more areas of the cutout region 202 may be scored to provide for one or more configuration options for the cutout region 202 and corresponding conductive ground tab 108. The outer barrier border 206 may be scored to remove the conductive ground tab template 200 from a sheet or roll having numerous conductive ground tab templates 200. These embodiments will be discussed below in further detail. For the purposes of this disclosure, "scored" may mean the layers of the conductive ground tab template 200 are pre-cut, but not all the way through all of the layers, or that the layers of the conductive ground tab template 200 are perforated. In this manner, holes or lines are cut or scored in a pattern that facilitates tearing or cutting of the cutout region 202 or the outer barrier border 206.

The barrier layer 210 of the conductive ground tab template 200 includes the top barrier surface 212. The top barrier surface 212 is configured to provide a template for application of a conductive material used for the conductive ground tab within the cutout region 202, while preventing the conductive material overlapping the top barrier surface 212 after application from contacting the structure 102 beneath the barrier layer 210. In other words, the top barrier surface 212 provides a barrier between the conductive material and the underlying structure. According to various embodiments, the barrier layer may include, but is not limited to, paper, plastic film, metal foil, or a combination thereof.

Figure 3A:
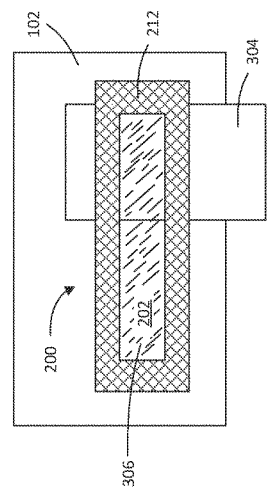
FIGS. 3A-3D show a conductive ground tab in consecutive stages of construction utilizing a conductive ground tab template according to various embodiments described herein.

Looking at FIGS. 3A-3D, a process for creating a conductive ground tab 108 using a conductive ground tab template 200 according to one embodiment will be discussed. In FIG. 3A, a conductive ground tab 108 is to be applied to the structure 102 and component 304. For purposes of clarity, the disclosure herein discusses the application of a conductive ground tab template 200 and corresponding conductive ground tab 108 to a structure 102. It should be appreciated that multiple structures or components may be included within the cutout region 202 such that the resulting conductive ground tab 108 overlaps more than one structure or component. For example, as shown and discussed with respect to FIG. 1, the conductive ground tab 108 overlaps a structure 102 (pipe) and a fitting 106. In the example shown in FIGS. 3A-3D, the conductive ground tab 108 will be applied over the structure 102 and abutting component 304; however, for the purposes of clarity, the example will be described in terms of the conductive ground tab template 200 and corresponding conductive ground tab 108 being applied to the structure 102.

In FIG. 3A, the conductive ground tab template 200 is applied to the desired location of the structure 102. In doing so, the bottom adhesive surface 224 of the adhesive layer 220 is pressed onto the surface of the structure 102 at the desired location of the conductive ground tab 108 after removing the backing layer 320. As will be described in greater detail below, one or more expansion regions may be removed from the cutout region 202 to arrive at the desired configuration of the cutout region 202 prior to applying the conductive ground tab template 200 to the structure 102.

Figure 3B:
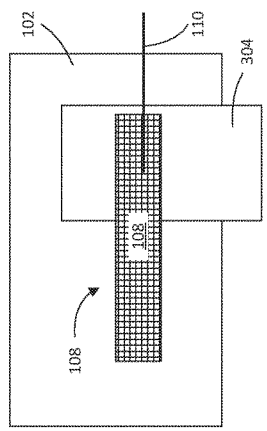
Figure 3C:
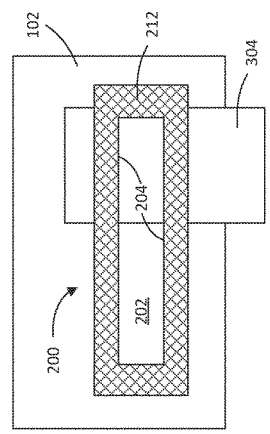
Figure 3D:
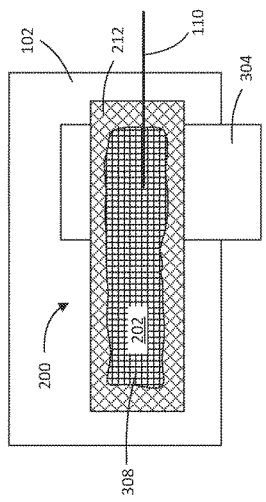

In FIG. 3B, the surface or surfaces within the cutout region 202 are abraded to prepare the area for the conductive material. As shown in FIG. 3C, the conductive material 308 is applied to the cutout region 202. The conductive material 308 may be a conductive RTV silicone that is brushed, rubbed, or otherwise applied onto the conductive ground tab template 200 to fully cover the cutout region 202, overlapping the top barrier surface 212. According to one implementation, the conductive RTV silicone may be applied from a syringe and spread out over the cutout region using a squeegee or flat blade. The conductor 110 may be inserted into the conductive material 308 to provide an electrical connection from the conductor 110 to the structure 102 through the conductive material 308. FIG. 3D shows the resulting conductive ground tab 108 after the conductive ground tab template 200 is peeled off of the structure 102. The conductive ground tab template 200 may be peeled off while the conductive material 308 is still wet prior to curing to ensure that the conductive ground tab template 200 may be cleanly removed, separating the conductive material 308 on the top barrier surface 212 from the cutout region 202 along the cutout border 204.

FIGS. 4A-4E show top views of conductive ground tab templates 200 according to various alternative embodiments described herein. FIG. 4A shows a conductive ground tab template 200 having a configurable arrangement 402. The configurable arrangement 402 allows a technician or user to configure the size, shape, or shape and size of the cutout region 202. The example shown in FIG. 4A has a cutout region 202 that is rectangular. According to this example, the cutout region 202 has a primary cutout region 404 that is open for receiving the conductive material 308. However, in this example, the configurable arrangement 402 of the cutout region 202 provides multiple scored expansion regions 406A-406D (generally referred to as scored expansion regions 406) that may be selectively exposed to form a selected geometry of the cutout region 202. With the linear arrangement of the primary cutout region 404 and the scored expansion regions 406, the user may alter the length of the cutout region 202 to create conductive ground tabs 108 of lengths ranging from L1 to L1-L5.

For example, a user may utilize the conductive ground tab template 200 of FIG. 4A to create a conductive ground tab 108 sized according to the primary cutout region 404, specifically having height H and length L1. If the height H is 0.5 inches and the length L1 is 1.0 inch, then the resulting conductive ground tab 108 will be 0.5 inches by 1.0 inches. Using the same or an identical conductive ground tab template 200 as the template shown in FIG. 4A, the user may create conductive ground tabs 108 having H=0.5 inches and a length in any 0.5 inch increment from 1.0 inches to 3.0 inches if L2-L5 are all 0.5 inch increments. As an example, to create a 0.5 by 2.5 inch conductive ground tab 108 using the conductive ground tab template 200 shown in FIG. 4A, the user would remove the scored expansion regions 406A, 406B, and 406C by tearing them away along the scored borders. Doing so exposes a cutout region 202 having a length equivalent to the primary cutout region 404 (1.0 inch) plus the length of the scored expansion regions 406A (0.5 inches), 406B (0.5 inches), and 406C (0.5 inches), to a total cutout region 202 having dimensions of 0.5 inches by 1.0 inch. While FIGS. 4B and 4E do not show any scored expansion regions 406, it should be understood that any conductive ground tab template 200 could have one or more scored expansion regions 406 without departing from the scope of this disclosure.

FIG. 4B shows an example conductive ground tab template 200 having a cutout region 202 having a geometric configuration that may be specific to a particular implementation. Specifically, the geometric configuration of this example is non-linear such that the cutout region 202 includes at least two non-parallel portions, 408 and 410. The conductive ground tab template 200 is not limited to a rectangular or an L-shaped cutout region 202 or any particular geometric configuration. Moreover, in this example, the outer barrier border 206 that is defined by an outer edge 207 of the conductive ground tab template 200 is shaped according to the geometric configuration of the cutout region 202 to provide a top barrier surface 212 of approximately uniform thickness around the cutout region 202. However, the geometric configuration of the outer barrier border 206 may differ from the geometric configuration of the cutout region 202, as is shown in FIG. 4C.

FIG. 4C illustrates an example of a conductive ground tab template 200 in which the cutout region 202 has multiple scored expansion regions 406 that may be selected to change the geometric configuration of the cutout region 202. Looking at the conductive ground tab template 200 of FIG. 4C, if the cutout region 202 includes only the primary cutout region 404 such that the scored expansion regions 406A and 406B remain in place, then the resulting conductive ground tab 108 will be rectangular. However, if the user removes the scored expansion region 406A, then the cutout region 202 will include the primary cutout region 404 and the scored expansion region 406A, which will result in an L-shaped conductive ground tab 108.

FIG. 4D shows an example conductive ground tab template 200 having an open cutout region 412. All examples previously discussed utilized a cutout region, which was defined as having a cutout border 204 with an inner edge 205 that is closed and continuous, enclosing the cutout region 202 with the top barrier surface 212 surrounding the cutout region 202. In contrast, the conductive ground tab template 200 of FIG. 4D has an open cutout region with an open configuration. With this open configuration, the conductive ground tab template 200 is used to protect only a portion of the surface of the structure 102 to which it is applied. Depending on the features of the structure 102, an open configuration may be beneficial when precise control of the dimensions of the open cutout region 412 and corresponding conductive ground tab 108 is not required.

FIG. 4E shows an example conductive ground tab template 200 having alignment markers 416 on the top barrier surface 212. The alignment markers 416 visually distinguish a portion of the top barrier surface 212 for aligning the conductive ground tab template 200 with a feature of the structure 102. The alignment markers 416 are shown in this example to be solid lines embedded into or printed onto the top barrier surface 212. However, the present disclosure is not limited to any type, quantity, or placement of alignment markers 416. Some conductive ground tab templates 200 may have particular types of alignment markers 416 that are specific to a particular implementation that may depend on any number of factors such as what type of structure 102 the conductive ground tab 108 is being created and where the ground tab is being placed. According to one embodiment, a conductive ground tab template 200 may have multiple alignment markers 416 corresponding to different implementations so that the conductive ground tab template 200 are universally used in multiple applications.

Figure 5:
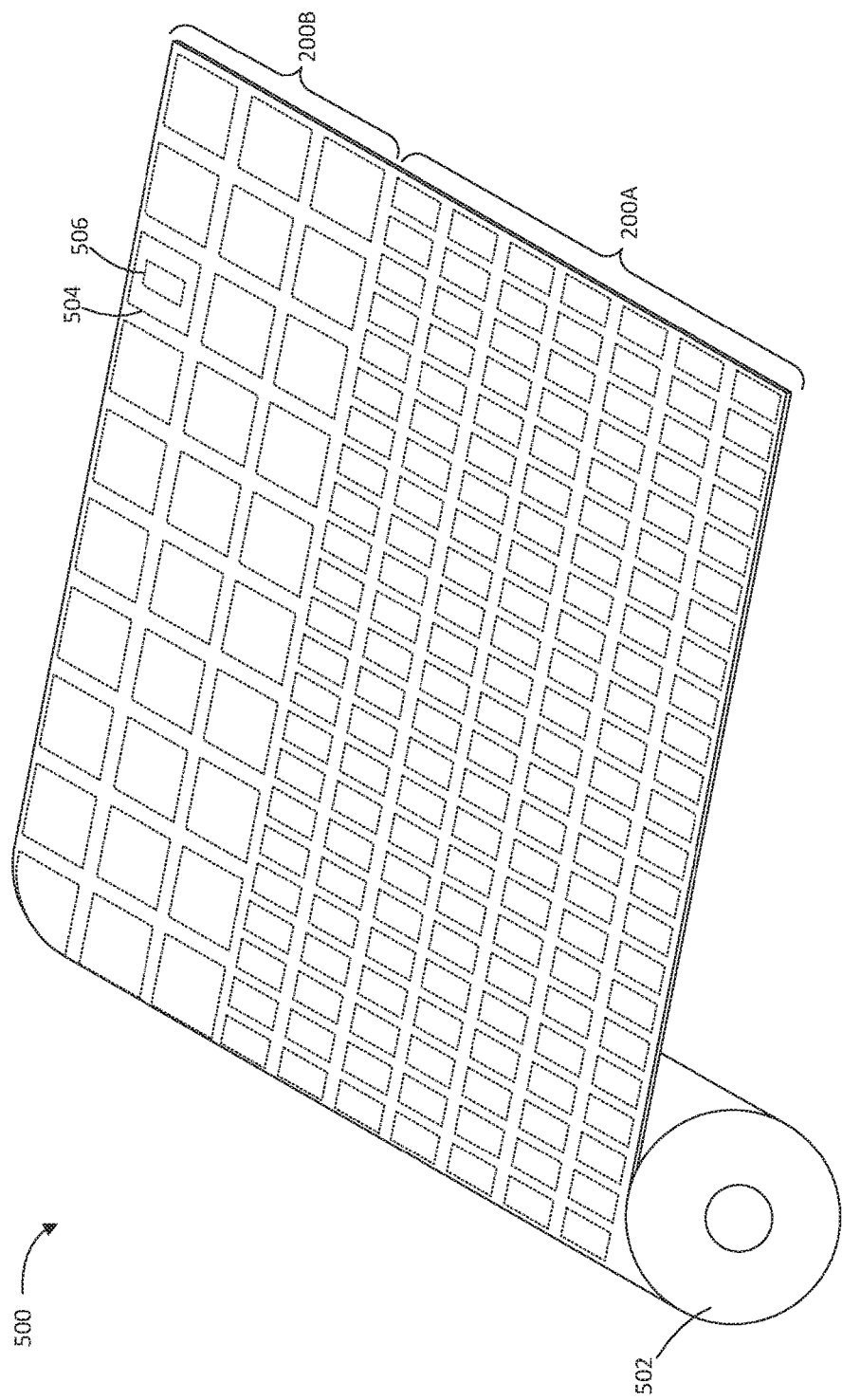
FIG. 5 is a perspective view of a conductive RTV ground tab template system according to various embodiments described herein.

FIG. 5 is a perspective view of a conductive RTV ground tab template system 500 according to various embodiments described herein. The conductive ground RTV ground tab system 500 includes a roll 502 or sheet of conductive ground tab templates 200. The conductive ground tab templates 200 of this example are conductive ground RTV ground templates, but as stated above, the present disclosure is not limited to the use of conductive RTV silicone as the conductive material 308. The roll 502 includes a barrier layer 210 and the adhesive layer 220 as described above with respect to the conductive ground tab templates 200 of FIGS. 2A and 2B. The roll 502 has rows and columns of conductive ground tab templates 200. For clarity purposes, broken rectangles of a first size are shown to illustrate a first type of conductive ground tab templates 200A and broken squares of a second size are shown to illustrate a second type of conductive ground tab templates 200B. It should be understood that the roll 502 may include a single type of conductive ground tab templates 200 or any number of types of conductive ground tab templates 200. Each conductive ground tab template 200 has an outer scored border 504 and an inner cutout region 506 to enable the conductive ground tab template 200 to be removed from the roll 502, and to enable the cutout region 202 to be removed from the conductive ground tab template 200.

Figure 6:
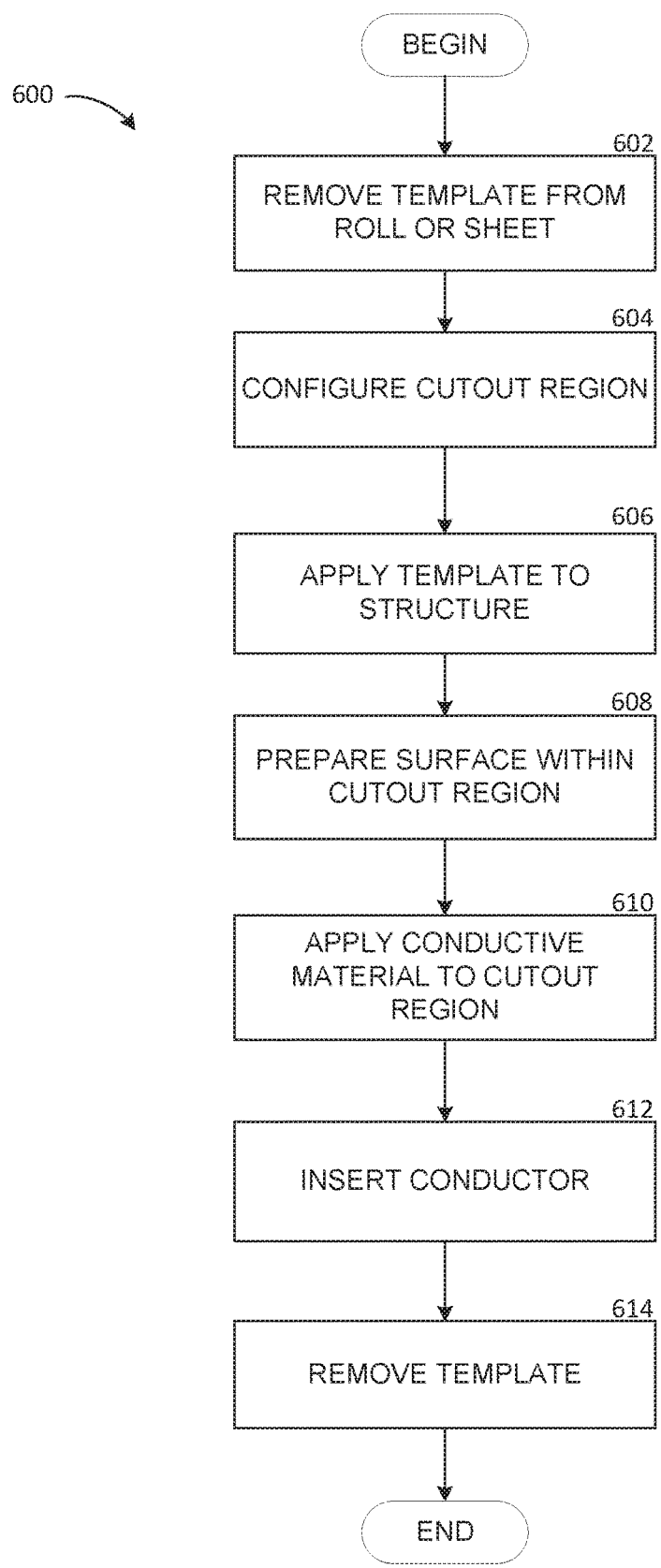
FIG. 6 is a flow diagram showing a method for forming a conductive ground tab according to various embodiments described herein.

FIG. 6 shows a routine 600 for forming a conductive ground tab 108 according to various embodiments presented herein. It should be appreciated that more or fewer operations may be performed than shown in the figures and described herein. These operations may also be performed in parallel, or in a different order than those described herein.

The routine 600 begins at operation 602, where a conductive ground tab template 200 is selected for the particular application and removed from a roll 502 or sheet, if the conductive ground tab template 200 is created on a roll 502 or sheet having a number of conductive ground tab templates 200. At operation 604, the cutout region 202 is configured if the conductive ground tab template 200 has a configurable arrangement 402. As discussed above, configuring the cutout region 202 may include removing one or more scored expansion regions 406 to expose a cutout region 202 having the desired geometric configuration.

From operation 604, the routine continues to operation 606, where the conductive ground tab template 200 is applied to the structure 102. Doing so may include removing the backing layer 230 and pressing the adhesive layer 220 onto the structure 102 at the desired location. This operation may additionally include aligning the alignment markers 416 on the top barrier surface 212 with the appropriate feature of the structure. At operation 608, the surface of the structure 102 within the cutout region 202 is prepared. This process may include creating an abrasion or cleaning the surface.

Conductive material 308 such as conductive RTV silicone is applied to the cutout region 202 at operation 610. Doing so will create an overlap of conductive material 308 onto the top barrier surface 212 of the conductive ground tab template 200. The conductive material 308 may be applied by any suitable means such as brushing or spreading the material onto the conductive ground tab template 200. A conductor 110 is inserted into the conductive material 308 to create an electrical connection between the conductor 110 and the structure 102 via the conductive material 308. At operation 614, the conductive ground tab template 200 is removed to create the conductive ground tab 108 and the routine 600 ends.

Based on the foregoing, it should be appreciated that technologies for conductive ground tab templates, and a corresponding method for providing a ground utilizing the same are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:
1. A conductive ground tab template comprising:
a barrier layer having a top barrier surface and a bottom barrier surface, the top barrier surface configured to prevent a conductive material applied to the top barrier surface from contacting a structure beneath the barrier layer;

an adhesive layer having a top adhesive surface fixedly attached to the bottom barrier surface, and a bottom adhesive surface configured for removable attachment to the structure; and a cutout region having a cutout border encompassed by the barrier layer and having a configurable arrangement according to a plurality of application locations.

2. The conductive ground tab template of claim 1, wherein the conductive material is a conductive rubber material.

3. The conductive ground tab template of claim 2, wherein the conductive rubber material is a room temperature vulcanization (RTV) silicone.

4. The conductive ground tab template of claim 1, wherein the top barrier surface comprises at least one of paper, plastic film, and metal foil.

5. The conductive ground tab template of claim 1, wherein the bottom adhesive surface comprises a tacky material having weaker bonding characteristics than the top adhesive surface.

6. The conductive ground tab template of claim 5, wherein the tacky material comprises at least one of a pressure sensitive adhesive, a heat sensitive adhesive, cement, and gum.

7. The conductive ground tab template of claim 1, wherein the cutout region wherein the cutout region has at least one scored expansion region, the scored expansion region being selectively exposed to form a selected geometry of the cutout region.

8. The conductive ground tab template of claim 7, wherein exposing at least one scored expansion region changes a geometric configuration of the cutout region.

9. The conductive ground tab template of claim 7, wherein the cutout region is rectangular.

10. The conductive ground tab template of claim 9, wherein the selected geometry comprises the cutout region having dimensions of 0.5 inches by 1.0 inches, 0.5 inches by 1.5 inches, and 0.5 inches by 2.0 inches.

11. The conductive ground tab template of claim 7, wherein the cutout region is non-linear such that the cutout region comprises at least two non-parallel portions.

12. The conductive ground tab template of claim 1, wherein the barrier layer further comprises an alignment marker visually distinguishing a portion of the top barrier surface for aligning the conductive ground tab template with a feature of the structure.

13. The conductive ground tab template of claim 1, wherein the barrier layer and the adhesive layer comprises an outer scored border defining the outer border of the conductive ground tab template in a sheet or roll of a plurality of conductive ground tab templates.

14. A method for forming a conductive ground tab, the method comprising:

applying a conductive ground tab template having a cutout region to a structure;

applying a quantity of conductive material to a portion of the structure exposed by the cutout region;

inserting a first end of a conductor into a portion of the conductive material disposed within the cutout region, a conductive electrical path being formed from a second end of the conductor through the conductive material to the structure; and removing the conductive ground tab template from the structure.

15. The method of claim 14, wherein applying the conductive ground tab template to the structure comprises securing an adhesive layer of the conductive ground tab template to the structure, wherein the adhesive layer comprises at least one of a pressure sensitive adhesive, a heat sensitive adhesive, cement, and gum.

16. The method of claim 14, wherein applying the quantity of conductive material to the portion of the structure exposed by the cutout region comprises applying the quantity of RTV silicone to the portion of the structure exposed by the cutout region.

17. The method of claim 14, further comprising removing at least one scored expansion region of the cutout region to select a geometry of the cutout region prior to applying the quantity of conductive material.

18. The method of claim 14, wherein removing the conductive ground tab template from the structure comprises removing the conductive ground tab prior to the conductive material being cured.

19. The method of claim 14, further comprising aligning an alignment marking on the conductive ground tab template to a feature of the structure prior to applying the conductive ground tab template to the structure.

20. A conductive RTV ground tab template system, comprising:

a barrier layer having a top barrier surface and a bottom barrier surface, the top barrier surface configured to prevent a conductive RTV material applied to the top barrier surface from contacting a structure beneath the bottom barrier surface;

an adhesive layer having a top adhesive surface fixedly attached to the bottom barrier surface, and a bottom adhesive surface configured for removable attachment to the structure; and a plurality of conductive RTV ground tab templates, each conductive RTV ground tab template comprising an outer scored border and an inner cutout region, the inner cutout region having a cutout border encompassed by the barrier layer and having a configurable arrangement according to a plurality of application locations.

* * * * *